United States Patent
Ramanathan et al.

(10) Patent No.: US 7,856,490 B2
(45) Date of Patent: *Dec. 21, 2010

(54) SYSTEM AND METHOD FOR MULTIPLE SPANNING TREE PROTOCOL DOMAINS IN A VIRTUAL LOCAL AREA NETWORK

(75) Inventors: Rajiv Ramanathan, Cupertino, CA (US); Jordi Moncada-Elias, Milpitas, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/580,230

(22) Filed: Oct. 15, 2009

(65) Prior Publication Data
US 2010/0260072 A1 Oct. 14, 2010

Related U.S. Application Data

(63) Continuation of application No. 10/456,756, filed on Jun. 9, 2003, now Pat. No. 7,627,654.

(51) Int. Cl.
*G06F 15/177* (2006.01)
(52) U.S. Cl. ....................... 709/221; 370/256
(58) Field of Classification Search ......... 709/220–223; 370/254–256
See application file for complete search history.

(56) References Cited

U.S. PATENT DOCUMENTS

| | | | |
|---|---|---|---|
| 5,761,435 A | 6/1998 | Fukuda et al. | |
| 5,878,232 A | 3/1999 | Marimuthu | |
| 5,959,968 A | 9/1999 | Chin et al. | |
| 5,995,486 A | 11/1999 | Iliadis | |
| 6,163,543 A | 12/2000 | Chin et al. | |
| 6,202,114 B1 | 3/2001 | Dutt et al. | |
| 6,204,114 B1 | 3/2001 | Clampitt et al. | |
| 6,262,977 B1 | 7/2001 | Seaman et al. | |
| 6,282,589 B1 | 8/2001 | Porterfield et al. | |
| 6,304,575 B1 | 10/2001 | Carroll et al. | |
| 6,628,624 B1 | 9/2003 | Mahajan et al. | |
| 6,628,661 B1 | 9/2003 | Goldman et al. | |
| 6,658,004 B1 | 12/2003 | Kadansky et al. | |

(Continued)

OTHER PUBLICATIONS

Abdelhalim, Ahmed, IP/MPLS-Based vs. Layer-2, Whitepaper, 16 pgs. (Mar. 22, 2002).

(Continued)

*Primary Examiner*—Salad Abdullahi
(74) *Attorney, Agent, or Firm*—Nixon Peabody LLP; John P. Schaub

(57) ABSTRACT

A system and method that modifies the behavior of the IEEE 802.1D STP standard to thereby decouple the one data domain from the one control domain involves managing multiple spanning tree protocol (STP) instances in a virtual local area network (VLAN). The method includes the step of assigning a unique set of ports within the VLAN to each of the multiple STP instances. Then, each of the multiple STP instances are managed to keep each of the multiple STP instances separate. Finally, when a topology change is detected in one of the multiple STP instances, entries that have been learned on the unique set of ports assigned to the STP protocol instance where the topology change is detected are fast-aged or transitioned from one state to another.

18 Claims, 8 Drawing Sheets

U.S. PATENT DOCUMENTS

| | | | |
|---|---|---|---|
| 6,697,339 | B1 | 2/2004 | Jain |
| 6,717,922 | B2 | 4/2004 | Hsu et al. |
| 6,766,482 | B1 | 7/2004 | Yip et al. |
| 6,795,403 | B1 | 9/2004 | Gundavelli |
| 6,801,506 | B1 | 10/2004 | Dey |
| 6,813,250 | B1 | 11/2004 | Fine et al. |
| 6,898,189 | B1 | 5/2005 | Di Benedetto et al. |
| 6,937,576 | B1 * | 8/2005 | Di Benedetto et al. ...... 370/256 |
| 6,985,449 | B2 * | 1/2006 | Higashiyama .............. 370/256 |
| 7,003,705 | B1 | 2/2006 | Yip et al. |
| 7,061,858 | B1 | 6/2006 | Di Benedetto et al. |
| 7,126,923 | B1 | 10/2006 | Yang et al. |
| 7,154,861 | B1 | 12/2006 | Merchant et al. |
| 7,171,504 | B2 | 1/2007 | Ishii |
| 7,209,435 | B1 | 4/2007 | Kuo et al. |
| 7,286,491 | B1 | 10/2007 | Smith |
| 7,606,229 | B1 | 10/2009 | Foschiano et al. |
| 7,620,693 | B1 | 11/2009 | Mott et al. |
| 2002/0154606 | A1 | 10/2002 | Duncan et al. |
| 2002/0159398 | A1 | 10/2002 | Yamada et al. |
| 2002/0181413 | A1 | 12/2002 | Kitagawa |
| 2003/0142680 | A1 | 7/2003 | Oguchi |
| 2003/0169694 | A1 | 9/2003 | Seaman |
| 2003/0223379 | A1 | 12/2003 | Yang et al. |
| 2003/0223442 | A1 | 12/2003 | Huang et al. |
| 2004/0081171 | A1 | 4/2004 | Finn |
| 2004/0255050 | A1 | 12/2004 | Takehiro et al. |
| 2005/0013260 | A1 | 1/2005 | Ramanathan et al. |
| 2005/0259597 | A1 | 11/2005 | Benedetto et al. |
| 2006/0206656 | A1 | 9/2006 | Di Benedetto et al. |
| 2006/0233186 | A1 | 10/2006 | Portolani et al. |
| 2008/0037428 | A1 | 2/2008 | Nation et al. |

OTHER PUBLICATIONS

Cobb, J. A., Convergent Multi-Path Routing =, Whitepaper, Intl. conf. on Network Protocols, 10 pgs. (2000).
Finn, Norman, Spanning the World With Ethernet, Powerpoint Presentation, 132 pp. (2001).
ANS/IEEE Std 802.id, 1998 Edition, Part 3: Media Access Control (MAC) Bridges, Adopted by the ISO/IEC 15802-3:1998, Sponsor LAN/MAN Standards Committee of the IEEE Computer Society, 374 pages.
U.S. Appl. No. 10/456,756, filed Jun. 9, 2003.
Office Action dated Mar. 21, 2007, U.S. Appl. No. 10/456,756.
Office Action dated Oct. 18, 2007, U.S. Appl. No. 10/456,756.
Office Action dated May 7, 2008, U.S. Appl. No. 10/456,756.
Office Action dated Jan. 27, 2009, U.S. Appl. No. 10/456,756.
Office Action dated Jul. 20, 2009, U.S. Appl. No. 10/456,756.
Notice of Allowance dated Sep. 17, 2009, U.S. Appl. No. 10/456,756.
U.S. Appl. No. 10/632,591, filed Aug. 1, 2003.
Office Action dated Jun. 26, 2007, U.S. Appl. No. 10/632,591.
Office Action dated Mar. 5, 2008, U.S. Appl. No. 10/632,591.
Notice of Allowance dated Aug. 4, 2008, U.S. Appl. No. 10/632,591.
Notice of Allowance dated Jan. 12, 2009, U.S. Appl. No. 10/632,591.
Notice of Allowance dated Mar. 13, 2009, U.S. Appl. No. 10/632,591.
Notice of Allowance dated Apr. 30, 2009, U.S. Appl. No. 10/632,591.
U.S. Appl. No. 10/632,635, filed Aug. 1, 2003.
Office Action dated Sep. 19, 2007, U.S. Appl. No. 10/632,635.
Final Office Action dated Mar. 17, 2008, U.S. Appl. No. 10/632,635.
Office Action dated Dec. 3, 2008, U.S. Appl. No. 10/632,635.
Notice of Allowance dated May 20, 2009, U.S. Appl. No. 10/632,635.
U.S. Appl. No. 11/246,945, filed Oct. 6, 2005.
Office Action dated Jun. 30, 2008, U.S. Appl. No. 11/246,945.
Office Action dated Dec. 30, 2008, U.S. Appl. No. 11/246,945.
Office Action dated Jul. 7, 2009, U.S. Appl. No. 11/246,945.
Office Action dated Mar. 30, 2010, U.S. Appl. No. 11/246,945.
U.S. Appl. No. 12/466,363, filed May 14, 2009.
Office Action in U.S. Appl. No. 12/466,363, mailed Sep. 22, 2010.
Notice of Allowance in U.S. Appl. No. 11/246,945, mailed Sep. 2, 2010.
U.S. Appl. No. 12/878,973, filed Sep. 9, 2010.

* cited by examiner

| 404 | |
|---|---|
| VLAN 100 ID | Port 3 ID |
| VLAN 100 ID | Port 4 ID |
| ... | |

| 406 | |
|---|---|
| VLAN 100 ID | Port 5 ID |
| VLAN 100 ID | Port 6 ID |
| ... | |

| 402 | |
|---|---|
| VLAN 100 ID | Port 1 ID |
| VLAN 100 ID | Port 2 ID |
| ... | |

FIG. 4

SYSTEM AND METHOD FOR MULTIPLE SPANNING TREE PROTOCOL DOMAINS IN A VIRTUAL LOCAL AREA NETWORK

CROSS-REFERENCE TO RELATED APPLICATIONS

The present application is a continuation of co-pending U.S. patent application Ser. No. 10/456,756 filed Jun. 9, 2003, in the name of inventors Rajiv Ramanathan and Jordi Moncada-Elias and entitled "System And Method For Multiple Spanning Tree Protocol Domains In A Virtual Local Area Network", commonly owned herewith.

BACKGROUND OF THE INVENTION

1. Field of the Invention

The invention disclosed herein relates generally to network configuration protocols. More specifically, the invention relates to the standard IEEE 802.1D spanning tree protocol in virtual local area networks.

2. Related Art

A computer network typically comprises a plurality of interconnected entities. An entity may consist of any network device, such as a server or end station, that transmits or receives data frames. A common type of computer network is a local area network ("LAN") which typically refers to a privately owned network within a single building or campus. LANs typically employ a data communication protocol, such as Ethernet or token ring, that defines the functions performed by the data link and physical layers of a communications architecture. In many instances, several LANs are interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a bridging function between two or more LANs. Alternatively, a switch may be utilized to provide a switching function for transferring information between a plurality of LANs or end stations. Bridges and switches are devices that operate at the Data Link layer ("layer 2") of the Open Systems Interconnection ("OSI") model. Their operation is defined in the American National Standards Institute ("ANSI") Institute of Electrical and Electronics Engineers ("IEEE") 802.1D standard. A copy of the ANSI/IEEE Standard 802.1D, 1998 Edition, is incorporated by referenced herein in its entirety.

Typically, a switch (or bridge) is a computer that includes a plurality of ports that are coupled to the LANs or end stations. Ports used to couple switches to each other are generally referred to as trunk ports. Ports used to couple switches to LANs or end stations are generally referred to as access ports. The switching function includes receiving data from a sending entity at a source port and transferring that data to at least one destination port for forwarding to a receiving entity.

Switches typically learn which destination port to use in order to reach a particular entity by noting on which source port the last message originating from that entity was received. This information is then stored in a block of memory referred to as a filtering database. Thereafter, when a message addressed to a given entity is received on a source port, the switch looks up the entity in its filtering database and identifies the appropriate destination port to reach that entity. If no destination port is identified in the filtering database, the switch floods the message out all ports, except the port on which the message was received. Messages addressed to broadcast or multicast addresses are also flooded.

A computer network may be segregated into a series of logical network segments. For example, any number of physical ports of a particular switch may be associated with any number of groups within the switch by using a virtual local area network ("VLAN") arrangement that virtually associates the port with a particular VLAN designation.

The VLAN designation for each local port is stored in a memory portion of the switch such that every time a message is received by the switch on a local port the VLAN designation of that port is associated with the message. Association is accomplished by a flow processing element which looks up the VLAN designation in the memory portion based on the local port where the message originated.

Most computer networks include redundant communications paths so that a failure of any given link or device does not isolate any portion of the network. The existence of redundant links, however, may cause the formation of loops within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

To avoid the formation of loops, many intermediate network devices execute a spanning tree algorithm that allows them to calculate an active network topology which is loop-free and yet connects every pair of VLANs within the network. The IEEE 802.1D standard defines a spanning tree protocol ("STP") to be executed by 802.1D compatible devices (e.g., bridges, switches, and so forth). With the IEEE 802.1D STP standard, one data domain is coupled with one control domain.

In general, by executing the STP, switches elect a single switch to be the root bridge. In addition, for each VLAN coupled to more than one switch, only one (the designated bridge) is elected to forward frames to and from the respective VLAN. The designated bridge is typically the one closest to the root. Each bridge also selects one port (its "root port") which gives the lowest cost path to the root.

The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames are not forwarded to or received from the port. A network administrator may also exclude a port from the spanning tree by placing it in a disabled state.

To obtain the information necessary to run the STP, switches exchange special control messages called bridge protocol data unit ("BPDU") messages. Conventional BPDU messages contain a number of fields, including a root bridge ID ("BID") which is the current root bridge; a path cost to the root bridge which indicates the distance to the root bridge; a sender BID which is the BID of the switch that sends the BPDU; and a port ID which is the actual port on the switch that the BPDU was sent from.

All of the switches constantly send BPDUs to each other, trying to determine the best path between various segments. When a switch receives a BPDU (from another switch) that is better than the one it is broadcasting for the same segment, it will stop broadcasting its BPDU out that segment. Instead, it will store the other switch's BPDU for reference and for broadcasting out to segments that are farther away from the root bridge.

A root bridge is chosen based on the results of the BPDU process between the switches. Initially, every switch considers itself the root bridge. When a switch first powers up on the network, it sends out a BPDU with its own BID as the root BID. When the other switches receive the BPDU, they compare the BID to the one they already have stored as the root BID. If the new root BID has a lower value, they replace the saved one. But if the saved root BID is lower, a BPDU is sent to the new switch with this BID as the root BID. When the new switch receives the BPDU, it realizes that it is not the root bridge and replaces the root BID in its table with the one it just received. The result is that the switch that has the lowest BID is elected by the other switches as the root bridge.

Based on the location of the root bridge, the other switches determine which of their ports has the lowest path cost to the root bridge. These ports are called root ports, and each switch (other than the current root bridge) must have one.

The switches determine who will have designated ports. A designated port is the connection used to send and receive packets on a specific segment. By having only one designated port per segment, all looping issues are resolved.

Designated ports are selected based on the lowest path cost to the root bridge for a segment. Since the root bridge will have a path cost of "0," any ports on it that are connected to segments will become designated ports. For the other switches, the path cost is compared for a given segment. If one port is determined to have a lower path cost, it becomes the designated port for that segment. If two or more ports have the same path cost, then the switch with the lowest BID is chosen.

Once the designated port for a network segment has been chosen, any other ports that connect to that segment become non-designated ports. These non-designated ports block network traffic from taking that path so it can only access that segment through the designated port.

Each switch has a table of BPDUs that it continually updates. The network is now configured as a single spanning tree, with the root bridge as the trunk and all the other switches as branches. Each switch communicates with the root bridge through the root ports, and with each segment through designated ports, thereby maintaining a loop-free network.

In response to network changes or failures, BPDU information is up-dated, and/or it times-out and causes the active spanning tree topology to be re-calculated. As a result, ports may transition from the blocking state to the forwarding state and vice versa. When a topology change is detected, the IEEE 802.1D STP standard moves the ports into fast-aging mode. This means that the Media Control Access ("MAC") addresses learned on those ports age (or transition from one state to another) at a faster rate (5 times) than normal MAC aging. That is, as a result of new BPDU information, a previously blocked port may learn that it should be in the forwarding state (e.g., it is now the root port or a designated port). Rather than transition directly from the blocking state to the forwarding state, ports typically transition through two intermediate states: a listening state and a learning state. In the listening state, a port waits for information indicating that it should return to the blocking state. If, by the end of a preset time, no such information is received, the port transitions to the learning state. At the end of a second preset time, the port transitions from the learning state to the forwarding state, thereby allowing data frames to be forwarded to and from the port.

As mentioned above, the IEEE 802.1D STP standard maintains one control domain. This happens because the VLAN to STP instance is unique. A port in the VLAN is automatically included in the single STP instance associated to that VLAN (there is a one-to-one mapping). Thus, the IEEE 802.1D STP standard suffers from several limitations when implemented in multiple large interconnected networks. The standard STP is prone to slow convergence times, sometimes upward of 30 to 50 seconds, and does not scale well as a topology expands to include additional spanning tree nodes. Additionally, the spanning tree domain (or control domain) must be continuous in order to ensure a loop free data path—changes within the spanning tree domain can affect all spanning tree members of that domain. Such ripple effects, for example, can cause problems in one city to affect other cites where large metro ring topologies are implemented.

SUMMARY OF THE INVENTION

The present invention relates to a system and method that allow a core network to host a plurality of edge (or customer) networks, where each network implements distinct instances of the spanning tree protocol (multiple control domains). The present invention is a system and method that modifies the behavior of the IEEE 802.1D STP standard to decouple the one data domain from the one control domain.

A method of the present invention for decoupling the one data domain from the one control domain involves managing multiple spanning tree protocol (STP) instances in a virtual local area network (VLAN). It includes the step of configuring each of the multiple STP instances by assigning unique set of ports within the VLAN to each of the multiple STP instances. Then, each of the multiple STP instances are managed to keep each of the multiple STP instances separate. Finally, when a topology change is detected in one of the multiple STP instances, entries that have been learned on the unique set of ports assigned to the STP protocol instance where the topology change is detected, are fast-aged (or transitioned from one state to another).

In the present invention, the step of configuring each of the multiple STP instances by assigning a unique set of ports within the VLAN to each of the multiple STP instances includes associating each of the multiple STP instances with a unique set of ports and an ID for the VLAN. Then, each port in the unique set of ports is associated with its associated STP instance. Finally, a software table is configured for each of the multiple STP instances.

Also in the present invention, the step of managing each of the multiple STP instances to keep each of the multiple STP instances separate includes receiving a bridge protocol data unit (BPDU) on a port in the VLAN. Then, which one of the multiple STP instances should process the BPDU is determined. Finally, the BPDU is forwarded to the determined STP instance for processing.

The present invention also includes a system for managing multiple STP instances in a VLAN. The system includes multiple STP instances in the VLAN and a STP module. The STP module configures each of the multiple STP instances by assigning a unique set of ports within the VLAN to each of the multiple STP instances. The STP module also manages each of the multiple STP instances to keep each of the multiple STP instances separate. When a topology change is detected in one of the multiple STP instances, the STP module fast-ages entries (or transitions them from one state to another) that have been learned on the unique set of ports assigned to the STP protocol instance where the topology change is detected.

The STP module of the present invention configures each of the multiple STP instances by associating each of the multiple STP instances with a unique set of ports and an ID for the VLAN. The STP module then associates each port in the unique sets of ports with its associated STP instance. Finally, the STP module configures a software table for each of the multiple STP instances.

The STP module of the present invention manages each of the multiple STP instances to keep each of the multiple STP instances separate by receiving a bridge protocol data unit (BPDU) on a port in the VLAN. The STP module then determines which one of the multiple STP instances should process the BPDU, and forwards the BPDU to the determined STP instance for processing.

BRIEF DESCRIPTION OF THE DRAWINGS/FIGURES

The present invention will be described with reference to the accompanying drawings, wherein:

FIG. 4 illustrates exemplary software tables utilized by the STP instances according to an embodiment of the present invention.

DETAILED DESCRIPTION OF THE INVENTION

A. Overview of the Invention

With the IEEE 802.1D STP standard, a VLAN has no control plane isolation. The present invention modifies the IEEE 802.1D STP standard so that instead of having a single STP domain (and thus no control plane isolation) running on the VLAN, there are multiple STP domains running on the VLAN. The present invention implements multiple STP domains by supporting multiple STP instances on the VLAN. The support of multiple STP instances by the present invention is accomplished via an STP module.

B. System Architecture Overview

Figure 1:
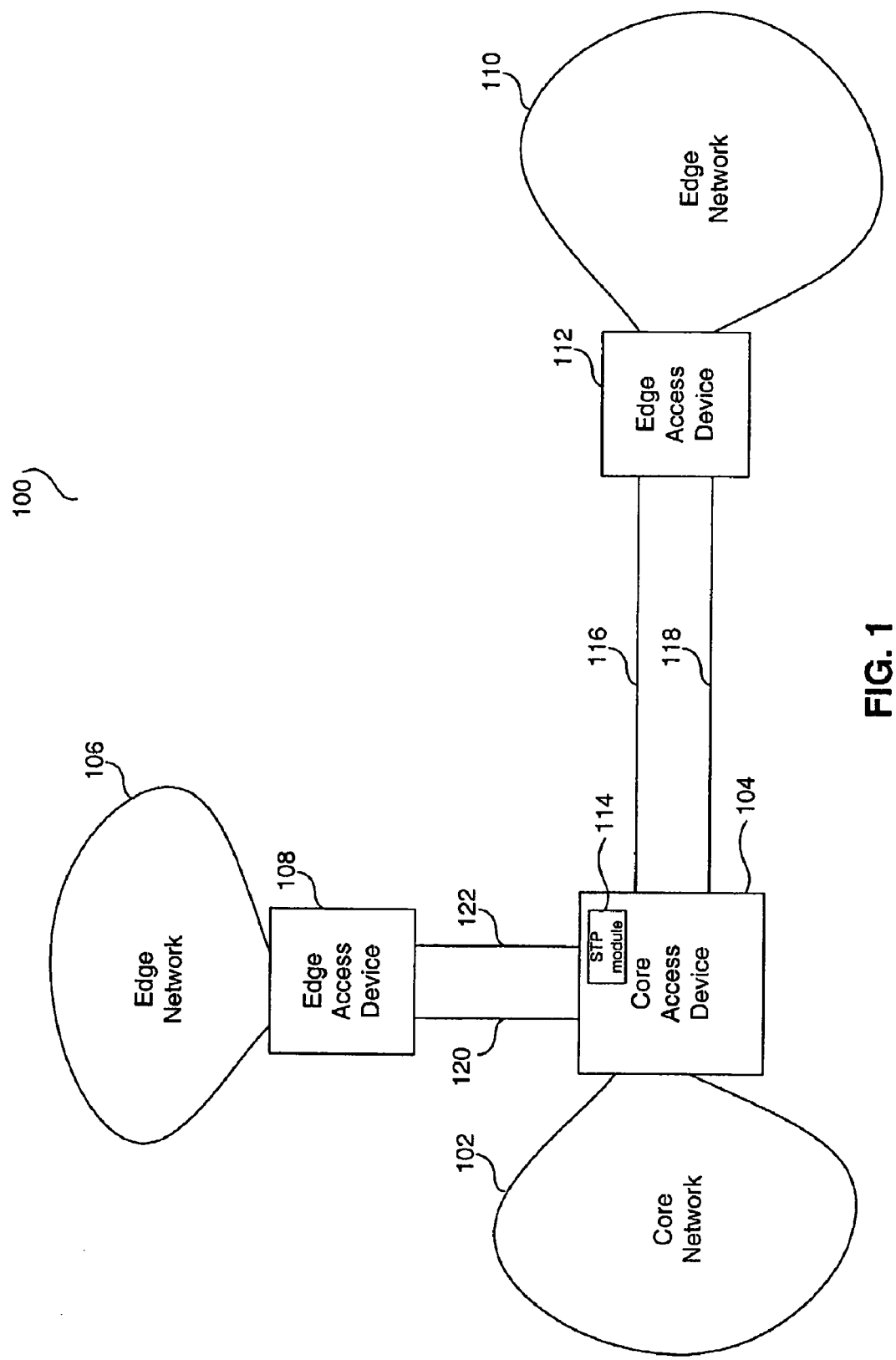
FIG. 1 is a block diagram representing an example operating environment according to an embodiment of the present invention.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations.

Referring to FIG. 1, a layer 2 VLAN 100 is shown. VLAN 100 includes a core network 102, a core access device 104, an edge network 106, an edge access device 108, an edge network 110 and an edge access device 112. Core access device 104 includes a STP module 114.

Core access device 104 is connected to edge access device 108 via communication paths 120 and 122. Core access device 104 is also connected to edge access device 112 via communication paths 116 and 118. Each of these components will be briefly described next.

Core access device 104, edge access device 108 and edge access device 112 are all 802.1D compatible devices (e.g., bridges, switches, and so forth). Core access device 104, edge access device 108 and edge access device 112 are end stations to core network 102, edge network 106 and edge network 110, respectively. Access devices 104, 108 and 112 may each be implemented as a computer that has multiple ports. Communication paths 116, 118, 120 and 122 provide redundant communications paths so that a failure of any given link or device does not isolate any portion of VLAN 100.

In an embodiment of the present invention, core network 102, edge network 106 and edge network 110 are all layer 2 networks that make up VLAN 100. All of the data traffic from core network 102, edge network 106 and edge network 110 are running on VLAN 100. Thus, there is no data plane isolation in VLAN 100. With the IEEE 802.1D STP standard, VLAN 100 would also have no control plane isolation. The present invention modifies the IEEE 802.1D STP standard so that instead of having a single STP domain (and thus no control plane isolation) running on VLAN 100, there are multiple STP domains running on VLAN 100. The present invention implements multiple STP domains by supporting multiple STP instances on VLAN 100. The support of multiple STP instances by the present invention is accomplished via STP module 114.

In an embodiment of the present invention, STP module 114 is a software entity that manages all STP instances of VLAN 100. STP module 114 may be implemented as an independent module that can run in a single process. For each STP instance it manages, STP module 114 associates with it a unique set of ports in VLAN 100 and VLAN 100's ID. Thus, the present invention allows multiple STP instances to be created with the same VLAN ID, each with different ports. The present invention ensures that no STP instances share any ports in VLAN 100.

It follows that each port associated with VLAN 100 is also associated with a specific STP instance. When a BPDU is received on a specific port, STP module 114 looks up the appropriate STP instance that needs to process the BPDU. Once the instance is located, the BPDU is passed onto the appropriate STP instance. The STP instance then processes the BPDU.

In addition, each STP instance generates BPDUs only on the ports of which it is associated. Each STP instance controls the port states (e.g., blocking, forwarding, etc.) for its assigned ports on VLAN 100. This way the two or more STP instances (or domains) associated with VLAN 100 will be completely isolated from each other. When a topology change is detected in VLAN 100, the IEEE 802.1D STP standard would move the ports into fast-aging mode. This means that the MAC addresses learned on those ports get aged (or transitioned from one state to another) at a faster rate (e.g., 5 times) than normal MAC aging. The same holds true for the present invention. A benefit that the present invention provides is that each STP instance only needs to fast-age entries that have been learned on the ports that it controls.

Figure 2:
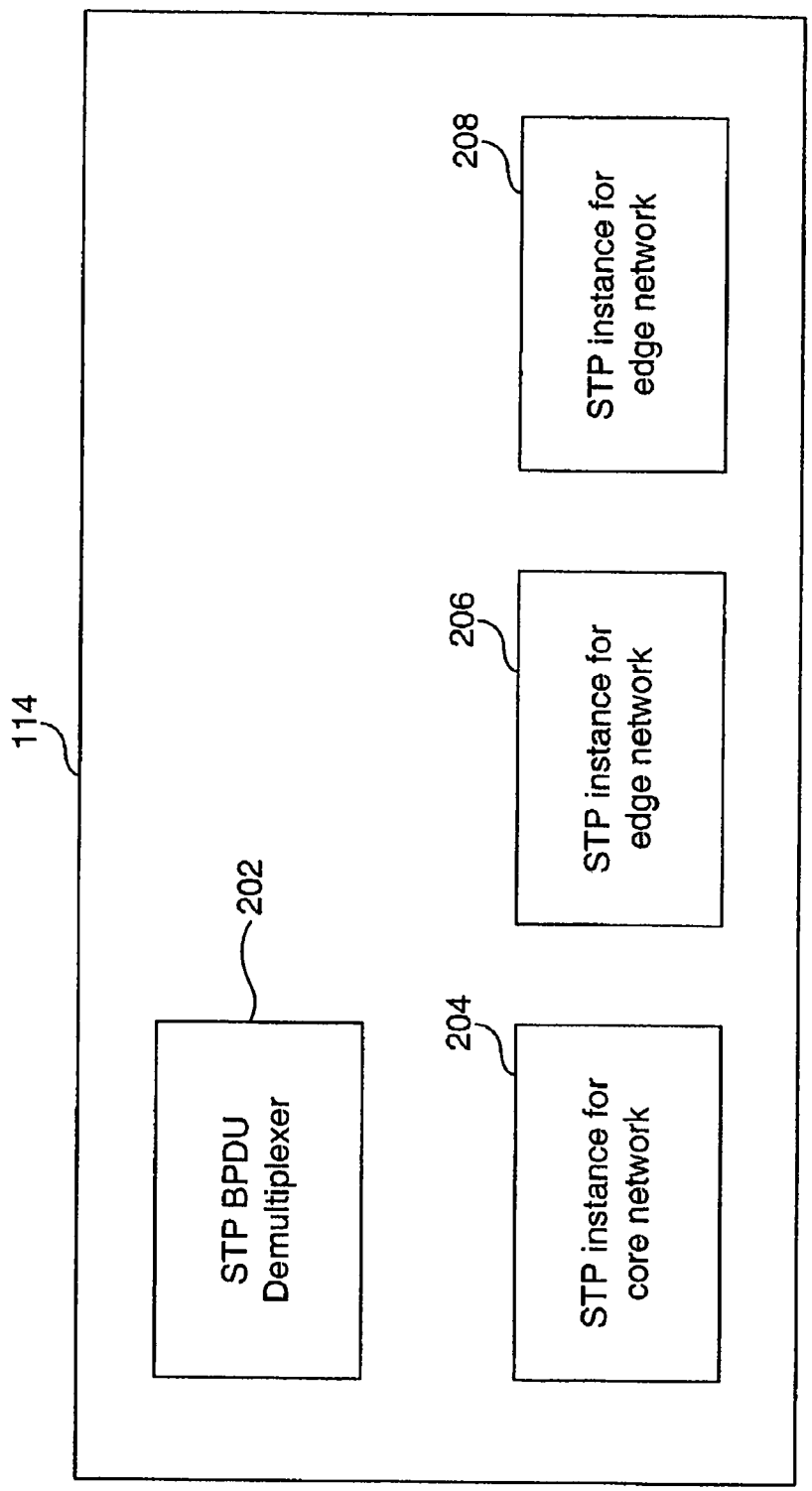
FIG. 2 illustrates an example STP instance configuration for the VLAN illustrated in FIG. 1 according to an embodiment of the present invention.
Figure 3:
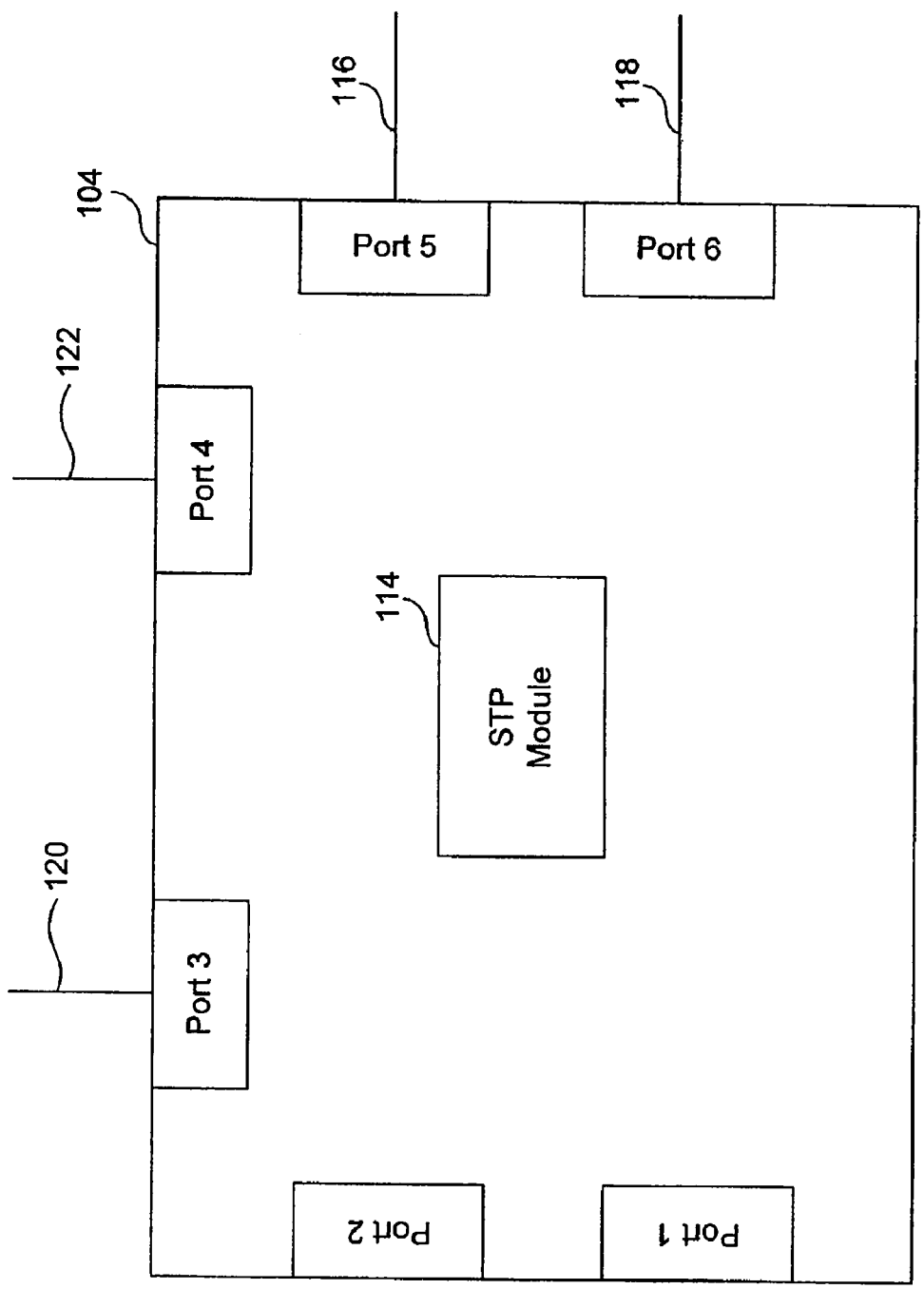
FIG. 3 illustrates an example assignment of ports in the core access device to STP instances illustrated in FIG. 2 according to an embodiment of the present invention.

The implementation overhead of multiple STP instances versus a single STP instance is minor. Only three additional bridge timers are needed for each STP instance. No additional port timers are required to implement the present invention. FIGS. 2 and 3 describe an example configuration of STP instances for VLAN 100. This example configuration is not meant to limit the invention and is provided for illustrations purposes only.

Via STP module 114, core access device 104 can operate one STP instance for its core network 102, one STP instance for edge network 106 and one STP instance for edge network 110. This allows for complete separation between the core and edge STP instances, and thus between the core and edge STP control. In order to achieve STP instance separation, each STP instance running on VLAN 100 must contain a unique set of ports. This is necessary to prevent any ambiguity in the forwarding state of the port within VLAN 100. This also allows for clear separation between edge network domains and the core network domain. An example STP instance configuration for VLAN 100 is described next with reference to FIG. 2 and STP module 114.

Referring to FIG. 2, STP module 114 includes a STP BPDU demultiplexer 202, a STP instance 204, a STP instance 206 and a STP instance 208. STP instance 204 represents the STP domain that includes a dedicated number of ports on core access device 104 and all of the other device ports in core network 102. Likewise, STP instance 206 represents the STP domain that includes a dedicated number of ports on core access device 104 and all of the other device ports in edge network 106. STP instance 208 represents the STP domain that includes a dedicated number of ports on core access device 104 and all of the other device ports in edge network 110.

In an embodiment of the present invention, each of STP instances 204-208 keeps track of VLAN 100 and the ports it is controlling by means of a software table. In order for each STP instance 204-208 to run independently from the other instances, each instance has its own timers and processes its own BPDUs (i.e., the BPDUs received on any of the ports on VLAN 100 that the STP instance controls).

STP BPDU demultiplexer 202 is a module that examines all of the BPDUs received by the ports in VLAN 100. For each BPDU received, STP BPDU demultiplexer 202 examines its contents and first determines whether it is correct (e.g., no corruption). If the BPDU is correct, then STP BPDU demultiplexer 202 gives the BPDU to the correct STP instance based on the port/VLAN pair from where it was received.

The way in which the present invention differentiates BPDUs from one network to another (i.e., from one STP instance to another) is based on the port/VLAN number. This combination is unique. A port/VLAN pair will be controlled by one and only one STP instance. An example assignment of ports in core access device 104 to STP instances 204-208 is described next with reference to FIG. 3.

Referring to FIG. 3, ports 1 and 2 are assigned strictly to core network 102 (communication paths not shown). Ports 3 and 4 are assigned strictly to edge network 106. Specifically, ports 3 and 4 are assigned to communication paths 120 and 122 of edge network 106, respectively. Ports 5 and 6 are assigned strictly to edge network 110. Specifically, ports 5 and 6 are assigned to communication paths 116 and 118 of edge network 110, respectively.

This assignment of the ports of core access device 104 may be done via the network administrator of core network 102. A port should not receive STP BPDUs associated with different STP instances. In the case where the ports of core access device 104 are incorrectly configured by associating different STP instances with the same edge network, a broadcast storm could result. As described above, each of STP instances 204-208 may keep track of VLAN 100 and the ports it is controlling by means of a software table. Exemplary software tables based on the port assignment of FIG. 3 are described next with reference to FIG. 4.

FIG. 4 illustrates three exemplary software tables, including software table 402, software table 404 and software table 406. Software table 402 is maintained by STP instance 204 and illustrates that STP instance 204 controls ports 1 and 2 of core access device 104 in VLAN 100. Likewise, software table 404 is maintained by STP instance 206 and illustrates that STP instance 206 controls ports 3 and 4 of core access device 104 in VLAN 100. Finally, software table 406 is maintained by STP instance 208 and illustrates that STP instance 208 controls ports 5 and 6 of core access device 104 in VLAN 100. Note that each of the software tables 402-406 would also include entries for all of the other ports they control. For example, STP instance 204 represents the STP domain that includes a dedicated number of ports on core access device 104 (i.e., ports 1 and 2) and all of the other device ports in core network 102. Therefore, software table 402 would include entries for the other device ports in core network 102. An exemplary operation of the present invention is described next with reference to FIGS. 5-7.

C. Operation of the Present Invention

Figure 5:
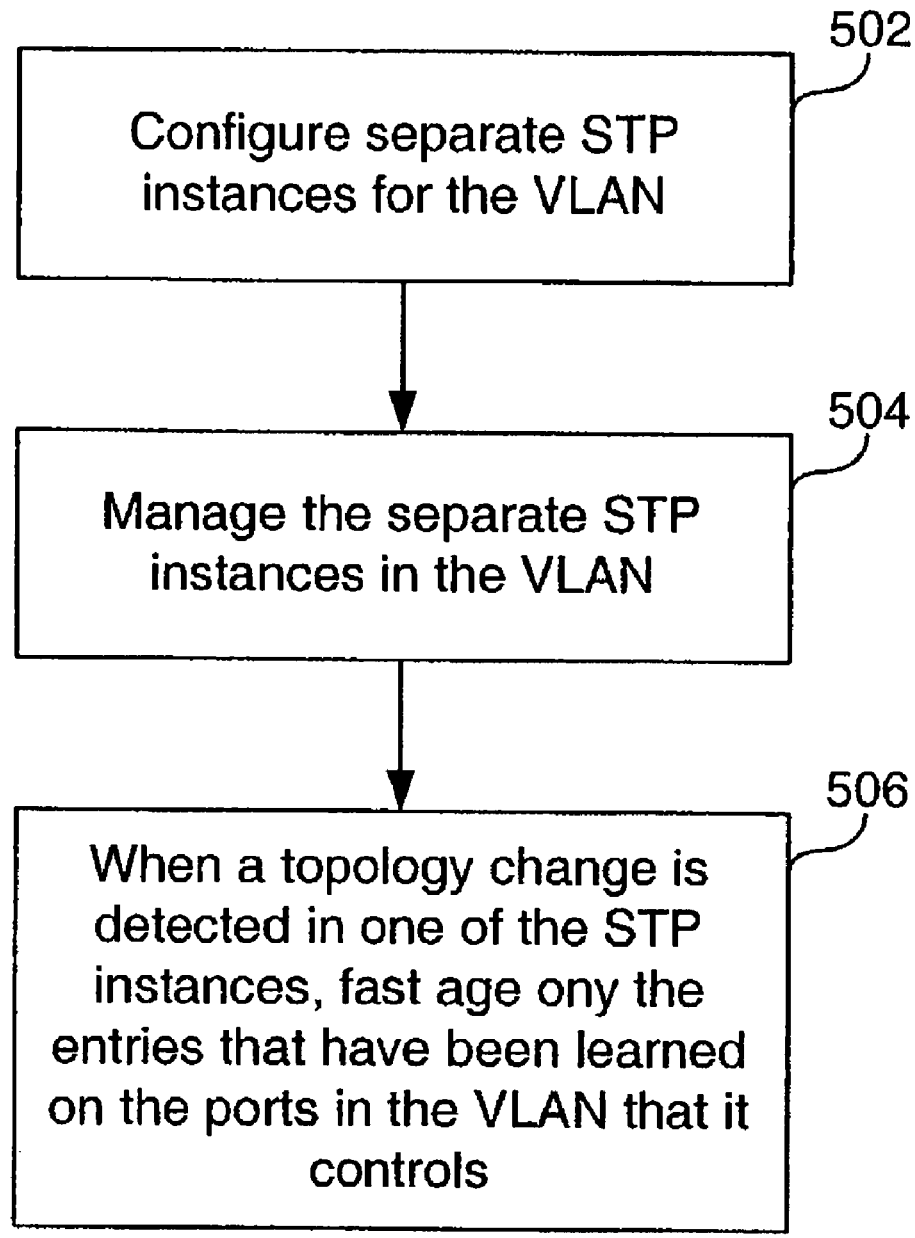
FIG. 5 is a flowchart illustrating the high level operation of the present invention according to an embodiment.

The flowchart in FIG. 5 illustrates the high level operation of the present invention. The flowchart in FIG. 5 starts at step 502, where separate STP instances are configured on one VLAN. This step is further described below with reference to FIG. 6.

In step 504, the separate STP instances are managed in the VLAN. This step is further described below with reference to FIG. 7.

In step 506, when a topology change is detected in one of the STP instances, fast-age only the entries that have been learned on the ports in the VLAN that are associated with the STP instance where the topology change occurred.

Figure 6:
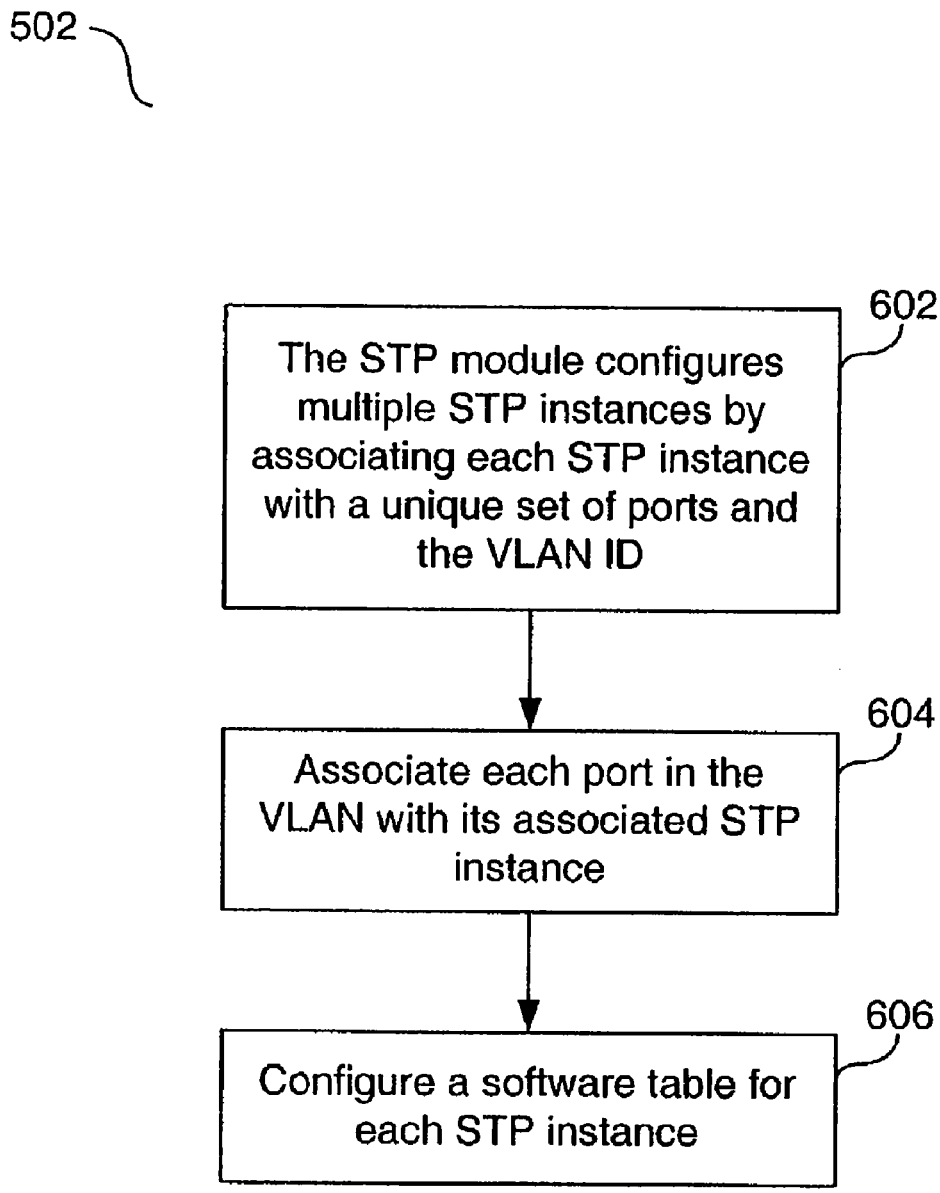
FIG. 6 illustrates a more detailed operation of the present invention where separate STP instances are configured on one VLAN according to an embodiment.

FIG. 6 further illustrates step 502 in FIG. 5 regarding configuring separate STP instances on the VLAN. The flowchart in FIG. 6 starts at step 602, where STP module 114 configures multiple STP instances by associating each STP instance with a unique set of ports and the VLAN ID.

In step 604, each port in the VLAN is associated with its associated STP instance. This association of the ports with its STP instance may be done by the network administrator.

In step 606, a software table is configured for each STP instance. Note that each software table includes an entry for each port its STP instance controls in the VLAN.

Figure 7:
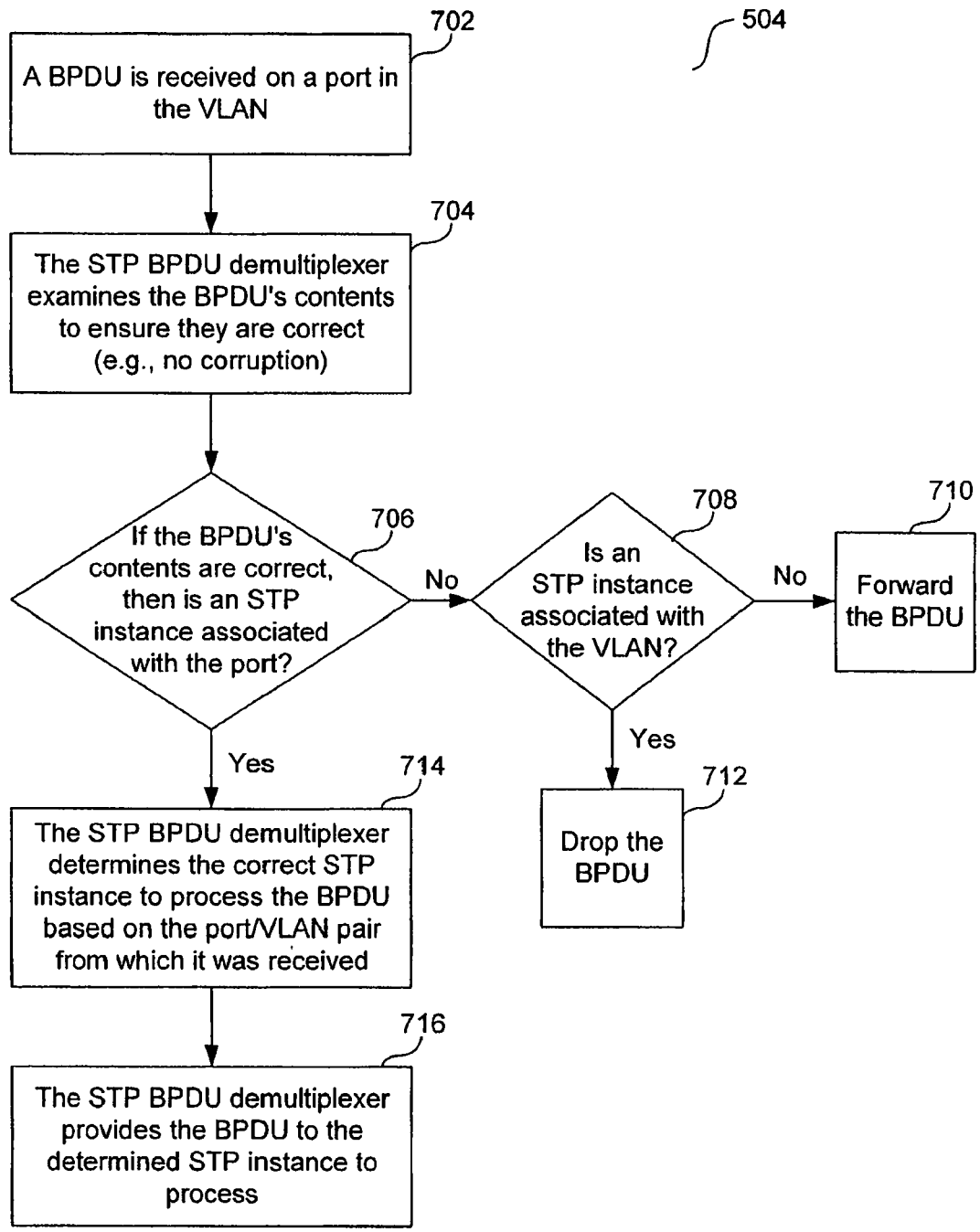
FIG. 7 illustrates a more detailed operation of the present invention where the separate STP instances are managed in the VLAN.

FIG. 7 further illustrates step 504 in FIG. 5 regarding managing the separate STP instances in the VLAN. The flowchart in FIG. 7 starts at step 702, where a BPDU is received on a port in the VLAN.

In step 704, STP BPDU demultiplexer 202 examines the BPDU's contents to ensure they are correct (e.g., they are not corrupted).

In step 706, if the BPDU's contents are correct, then it is determined whether an STP instance is associated with the port. If the outcome to step 706 is negative, then control passes to step 708. Alternatively, if the outcome in step 706 is positive, then control passes to step 714.

In step 708, it is determined whether an STP instance is associated with the VLAN. If the outcome to step 708 is negative, then control passes to step 710 where the BPDU gets forwarded on the VLAN. Alternatively, if the outcome in step 708 is positive, then control passes to step 712 where the BPDU gets dropped.

In step 714, STP BPDU demultiplexer 202 determines the correct STP instance to process the BPDU based on the port/VLAN pair from which it was received.

In step 716, STP BPDU demultiplexer 202 provides the BPDU to the determined STP instance to be processed. The BPDU is processed in a similar manner as it is done with the IEEE 802.1D STP standard. An example environment of the present invention is described next.

D. Example Environment of the Present Invention

Figure 8:
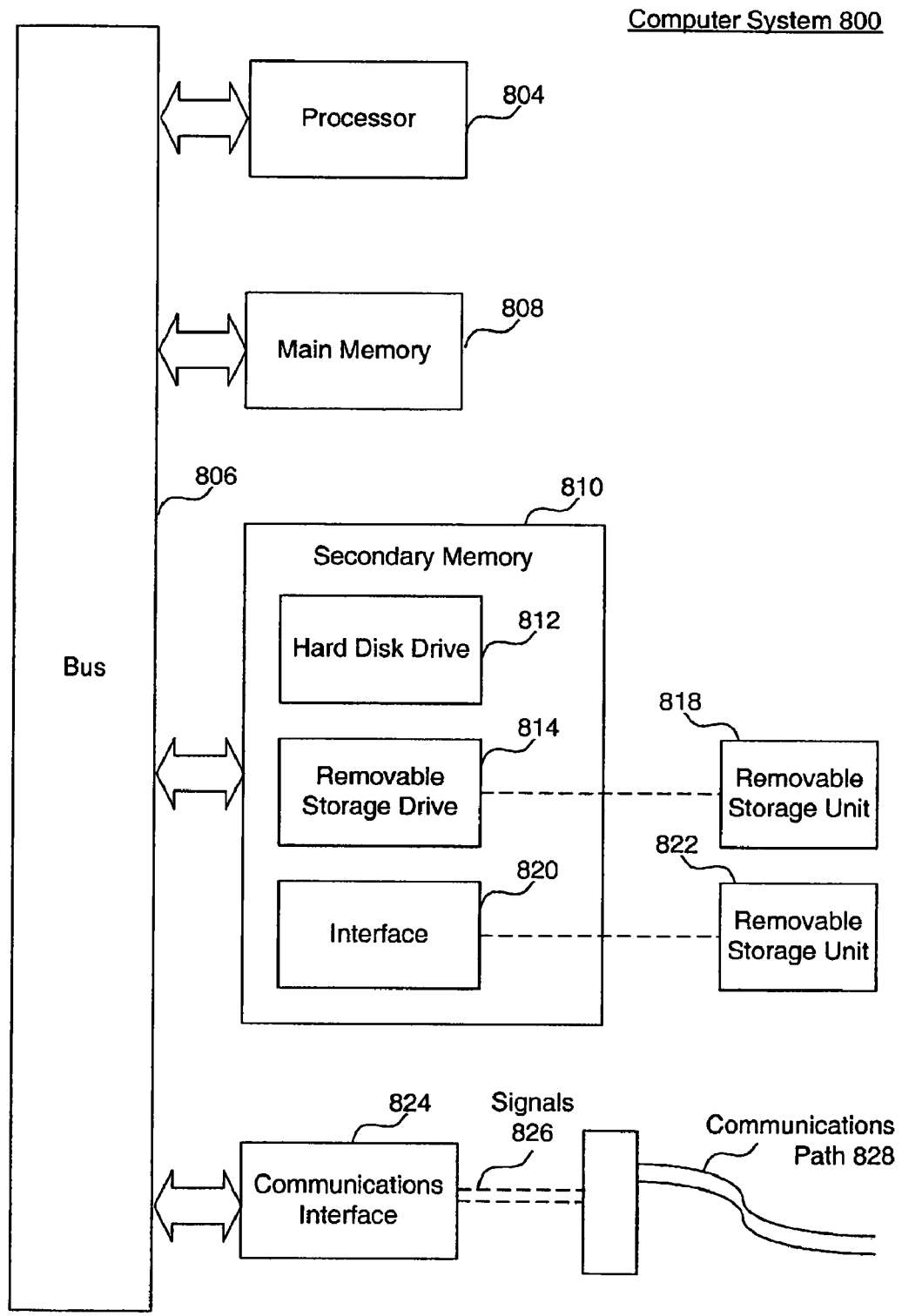
FIG. 8 illustrates an example computer that may be used to implement the access devices according to an embodiment of the present invention.

Access devices 104, 108 and 112 may be implemented using computer system 800 as shown in FIG. 8. The present invention may be implemented using hardware, software or a combination thereof and may be implemented in a computer system or other processing system. In fact, in one embodiment, the invention is directed towards one or more computer systems capable of carrying out the functionality described herein. The computer system 800 includes one or more processors, such as processor 804. The processor 804 is connected to a communication bus 806. Various software embodiments are described in terms of this example computer system. After reading this description, it will become apparent to a person skilled in the relevant art how to implement the invention using other computer systems and/or computer architectures.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 818 to computer system 800.

Computer system 800 can also include a communications interface 824. Communications interface 824 allows software and data to be transferred between computer system 800 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage unit 818, a hard disk installed in hard disk drive 812, and signals 826. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard disk drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

E. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A computer implemented method comprising:
    associating, by an access device having a network interface and a memory, each of multiple separate spanning tree protocol (STP) instances with a unique set of ports and an ID for a virtual local area network (VLAN);
    associating each port in the unique sets of ports with its associated STP instance;
    storing a representation of the associations in the memory; and
    when a topology change is detected in one of the multiple STP instances, transitioning entries from one state to another that have been learned on the unique set of ports assigned to the STP protocol instance where the topology change is detected.

2. The method of claim 1 further comprising managing each of the multiple STP instances to keep each of the multiple STP instances separate.

3. The method of claim 2, further comprising:
forwarding the BPDU if the receiving port and the VLAN are not associated with one of the multiple STP instances.

4. The method of claim 2, further comprising:
dropping the BPDU if the receiving port is not associated with one of the multiple STP instances and the VLAN is associated with one of the multiple STP instances.

5. The method of claim 2, further comprising:
examining the BPDU to ensure it is correct.

6. The method of claim 2, wherein the determining which one of the multiple STP instances should process the BPDU includes determining a port/VLAN pair from which the BPDU was received.

7. The method of claim 1, wherein the managing comprises:
receiving a bridge protocol data unit (BPDU) on a port in the VLAN;
determining which one of the multiple STP instances should process the BPDU; and
forwarding the BPDU to the determined STP instance for processing.

8. The method of claim 1 wherein the transitioning comprises fast-aging the entries.

9. A device comprising:
a network interface;
a memory; and
one or more modules configured to:
associate each of multiple separate spanning tree protocol (STP) instances with a unique set of ports and an ID for a virtual local area network (VLAN);
associate each port in the unique sets of ports with its associated STP instance;
store a representation of the associations in the memory; and
when a topology change is detected in one of the multiple STP instances, transition entries from one state to another that have been learned on the unique set of ports assigned to the STP protocol instance where the topology change is detected.

10. The device of claim 9 wherein the one or more modules are further configured to manage each of the multiple STP instances to keep each of the multiple STP instances separate.

11. The device of claim 10, wherein the managing comprises:
receiving a bridge protocol data unit (BPDU) on a port in the VLAN;
determining which one of the multiple STP instances should process the BPDU; and
forwarding the BPDU to the determined STP instance for processing.

12. The device of claim 11 wherein the one or more modules are further configured to
forward the BPDU if the receiving port and the VLAN are not associated with one of the multiple STP instances.

13. The device of claim 11 wherein the one or more modules are further configured to drop the BPDU if the receiving port is not associated with one of the multiple STP instances and the VLAN is associated with one of the multiple STP instances.

14. The device of claim 11 wherein the one or more modules are further configured to examine the BPDU to ensure it is correct.

15. The device of claim 11 wherein the determination of which one of the multiple STP instances should process the BPDU includes determining a port/VLAN pair from which the BPDU was received.

16. The device of claim 9 wherein the transition comprises fast-aging the entries.

17. An apparatus comprising:
means for associating, by an access device having a network interface and a memory, each of multiple separate spanning tree protocol (STP) instances with a unique set of ports and an ID for a virtual local area network (VLAN);
means for associating each port in the unique sets of ports with its associated STP instance;
means for storing a representation of the associations in the memory; and
means for, when a topology change is detected in one of the multiple STP instances, transitioning entries from one state to another that have been learned on the unique set of ports assigned to the STP protocol instance where the topology change is detected.

18. A non-transitory computer readable medium embodying a computer program to perform a method, the method comprising:
associating, by an access device having a network interface and a memory, each of multiple separate spanning tree protocol (STP) instances with a unique set of ports and an ID for a virtual local area network (VLAN);
associating each port in the unique sets of ports with its associated STP instance;
storing a representation of the associations in the memory; and
when a topology change is detected in one of the multiple STP instances, transitioning entries from one state to another that have been learned on the unique set of ports assigned to the STP protocol instance where the topology change is detected.

* * * * *